United States Patent [19]
Wesseling et al.

[11] 3,841,313
[45] Oct. 15, 1974

[54] STROKE VOLUME METER

[75] Inventors: Karel Hendrik Wesseling; Benjamino De Wit, both of Utrecht, Netherlands

[73] Assignee: U.S. Philips Corporation, New York, N.Y.

[22] Filed: Mar. 29, 1973

[21] Appl. No.: 346,054

[30] Foreign Application Priority Data
Apr. 5, 1972 Netherlands.................... 7204522

[52] U.S. Cl. ... 128/2.05 R, 128/2.05 F, 128/2.05 V
[51] Int. Cl............................................. A61b 5/02
[58] Field of Search ..... 128/2.05 R, 2.05 A, 2.05 F, 128/2.05 Q, 2.05 V; 235/151.34

[56] References Cited
UNITED STATES PATENTS

| | | | |
|---|---|---|---|
| 3,192,921 | 7/1965 | Erickson et al.............. | 128/2.05 R |
| 3,433,935 | 3/1969 | Sherman...................... | 128/2.05 F |
| 3,533,401 | 10/1970 | Streu........................... | 128/2.05 A |
| 3,570,474 | 3/1971 | Jonson......................... | 128/2.05 V |
| 3,618,592 | 9/1971 | Stewart........................ | 128/2.05 R |
| 3,651,318 | 3/1972 | Czekajewski................ | 128/2.05 F |
| 3,678,922 | 7/1972 | Phillips et al................ | 128/2.05 F |

OTHER PUBLICATIONS
Kouchoukas et al., "Surgical Forum", Estimation of Stroke Volume, 1969, pp. 180–182.

*Primary Examiner*—Richard A. Gaudet
*Assistant Examiner*—Lee S. Cohen
*Attorney, Agent, or Firm*—Frank R. Trifari; Bernard Franzblau

[57] ABSTRACT

A stroke volume meter for determining the stroke volume on the basis of the variation of the blood pressure in the aorta. To this end, the device comprises means for integrating the part of the diastolic aorta pressure which exceeds the end diastolic aorta pressure between the instant at which the end diastolic aorta pressure is reached and the instant at which the incision is reached.

11 Claims, 5 Drawing Figures

STROKE VOLUME METER

The invention relates to a stroke volume meter. Particularly before, during and after cardiac surgery, and possibly also during stress tests, it is desirable to know exactly the volume of blood pumped by the heart.

The variation of the blood pressure in the aorta during a pumping cycle of the heart is approximately as follows: beginning from a first minimum value (the end diastolic aorta pressure) the blood pressure increases to a first maximum value, after which it quickly decreases again to a second minimum value (the incision). Continuing from the second minimum value, which is higher than the first minimum value, the pressure increases again until a second maximum value is reached, after which it gradually decreases again to the end diastolic aorta pressure.

An object of the invention is to provide a device by means of which the volume of blood pumped by the heart every pumping cycle can be accurately measured. The invention is based on recognition of the fact that the aorta and subsequent vessels can be represented by a reflection-less transmission line during the expulsion phase of the heart.

The input impedance is then equal to the characteristic or wave impedance $Z_o$ of the system. This impedance is independent of the frequency. The pulsating flow F can then be calculated from the pulsating part of the pressure P, which is the part of the heart cycle between the end diastolic aorta pressure and the incision, by division by $Z_o$. $Z_o$ is a patient constant.

The invention is characterized by means for determining the instant at which the end diastolic aorta pressure is reached, by means for determining the instant at which the incision is reached, by means for determining the value of the end diastolic aorta pressure, by integration means which are adapted to integrate exclusively the part of the blood pressure in the aorta which is larger than the end diastolic aorta pressure from the instant at which this pressure is reached until the instant at which the incision is reached, and by means for dividing the value obtained by integration by an adjustable constant.

According to a preferred embodiment of the invention, the means for determining the instants at which the end diastolic pressure and the incision are reached comprise a first filter circuit which is adapted to produce a pulse each time the second derivative of the blood pressure signal to be processed reaches a maximum value, and a second filter circuit which is adapted to produce a bi-level signal which has a first value when the value of the blood pressure signal exceeds the mean value, and which has the second level when the blood pressure signal is smaller than the mean value, the outputs of the said filter circuits being connected to a logic circuit.

The means for determining the value of the end diastolic aorta pressure are preferably formed by a minimum value detector which can be controlled by means of the logic circuit. The integration means preferably consist of an integrator which can be controlled by means of the logic circuit and which is adapted to integrate the difference of two signals applied to its two imputs one input of the integrator being adapted to receive the blood pressure signal, and the other input being connected to the output of the minimum-value detector. So as to enable division of the signal obtained by integration by a patient constant, the output of the integrator is preferably connected to a sample-and-hold circuit having adjustable amplification.

The invention will be described in detail hereinafter with reference to the accompanying drawing in which.

Corresponding elements are denoted by the same digits and letters in the Figures.

Figure 1:
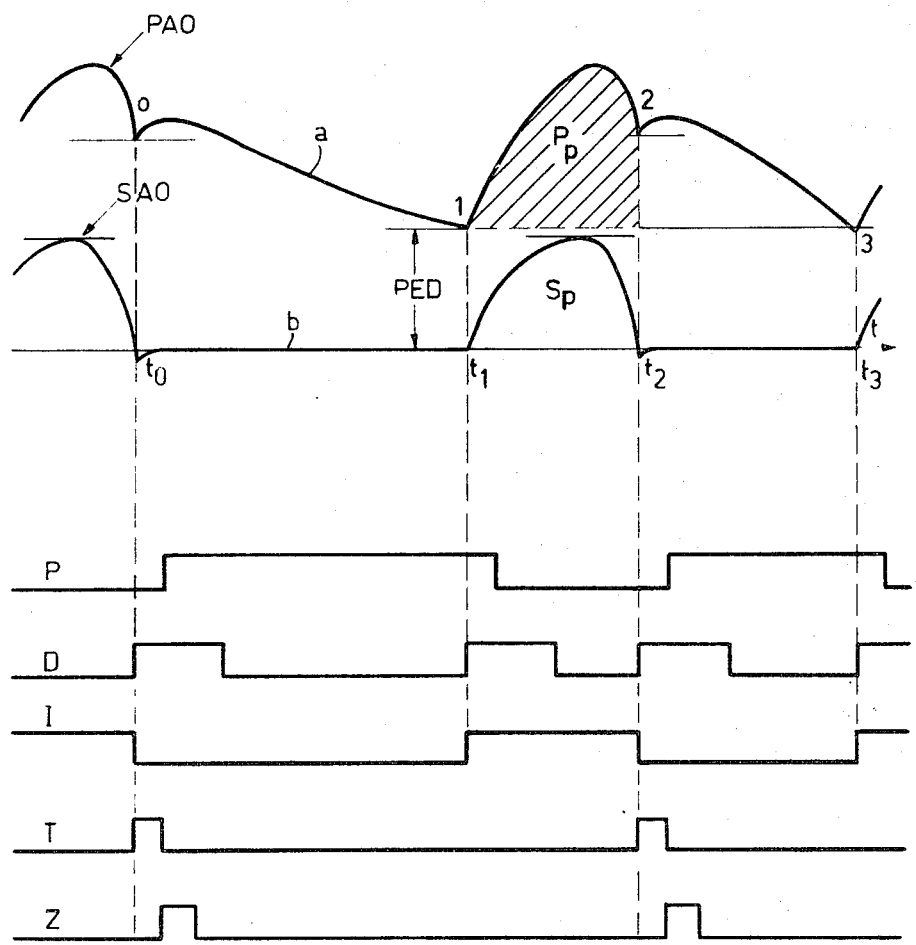
FIG. 1 shows an assembly of time diagrams so as to give a general illustration of the invention and to explain the operation of the embodiment shown in FIG. 2.

In FIG. 1 the aorta pressure PAO is graphically represented as the curve $a$. The variation of the curve $a$ between the points 1, 2 and 3 represents the pressure variation in the aorta during one pumping cycle of the heart. The curve $a$ exhibits the end diastolic pressure PED at the point 1, (3) at the instant $t_1$, $(t_3)$, and the incision at point 2 (0) at the instant $t_2$, $(t_0)$.

The variation of the volume of blood SAO displaced per unit of time is represented in FIG. 1 by the curve $b$. According to the concept of the invention, the aorta and the subsequent vessels can be represented by a reflectionless transmission line. As a result, the flow pulse Sp (the part below the curve $b$ between the instants $t_1$ and $t_2$) has substantially the same shape as the pressure pulse $P_P$ (the shaded part below curve $a$), and they relate according to a constant $Z_0$. In the intervals between two pulses ($t_0 - t_1$ and $t_2 - t_3$), no blood flows through the aorta. Consequently, for the calculation of the stroke volume SV it is sufficient to integrate the pulsating part of the aorta pressure over the duration of the flow pulse. The duration of the flow pulse Sp can be read from the aorta pressure. The transition from the rather flat part of the pressure to the sharply rising part indicates the beginning $t_1$ of the expulsion, the incision indicating the end $t_2$ of the expulsion. The stroke volume SV is substantially equal to the shaded surface below curve $a$, multiplied by a constant $1/Z_o$.

Figure 2:
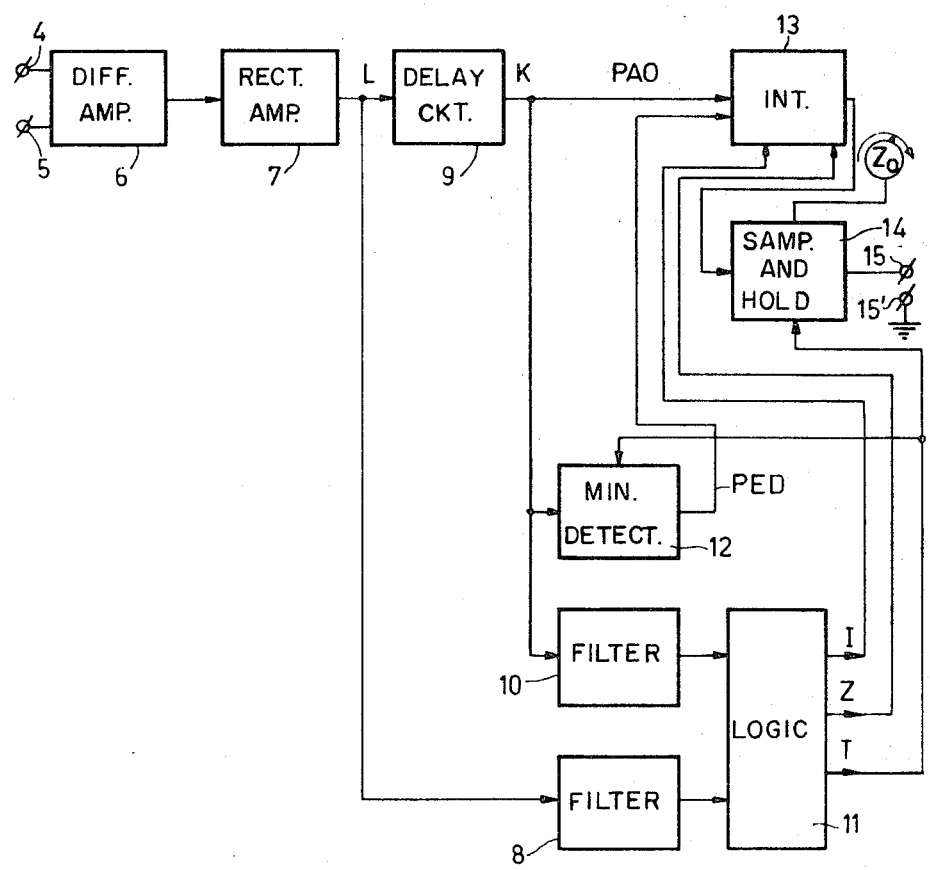
FIG. 2 shows a block diagram of an embodiment according to the invention.
Figure 3A:
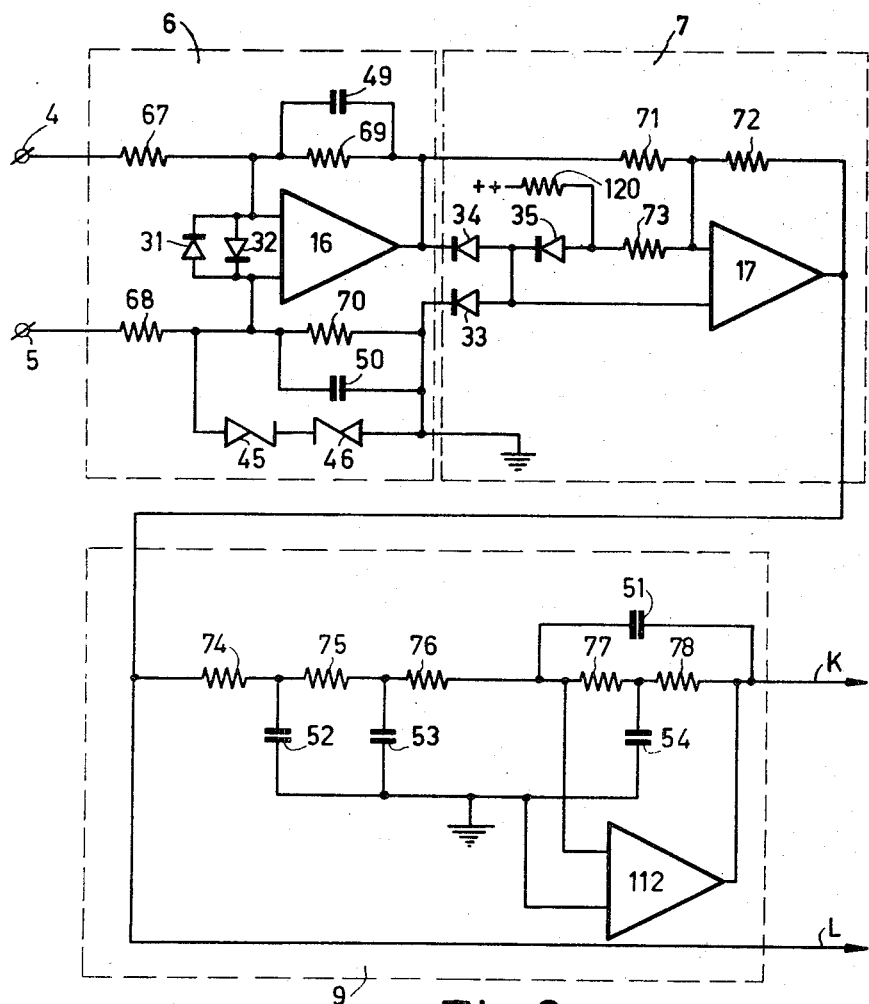
FIGS. 3a, 3b and 3c show a more detailed diagram of the embodiment shown in FIG. 2.
Figure 3B:
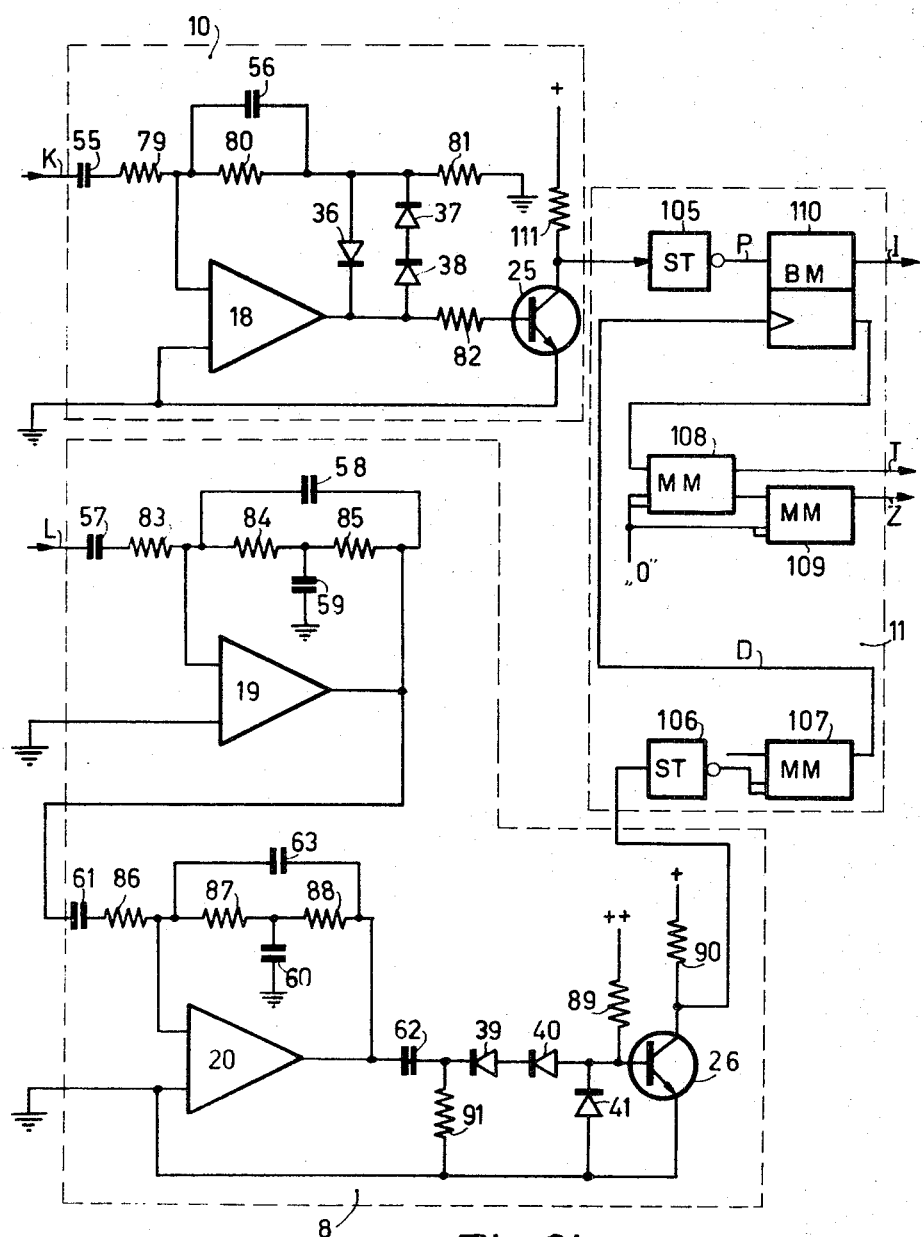
Figure 3C:
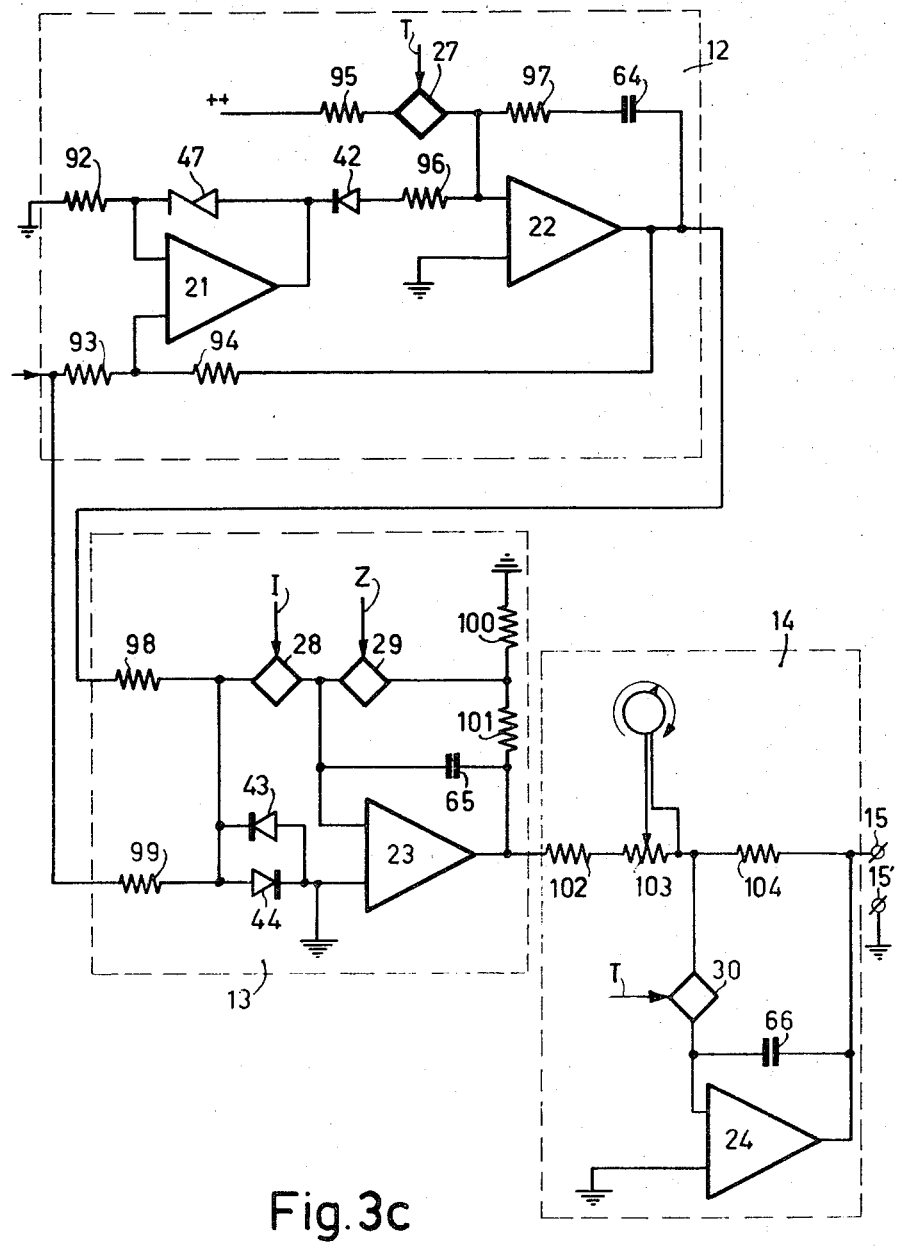

The aorta pressure signal PAO can be obtained by catherization in a known manner which will not be described in this context. For the calculation of the stroke volume SV from this signal, the signal is applied to a device according to the invention of which FIGS. 2 and 3 show an embodiment, FIG. 2 being a block diagram and FIG. 3 showing circuit diagrams of the various blocks of FIG. 2.

The aorta pressure signal PAO is applied (see FIG. 2) to the input terminals 4 and 5 of a differential amplifier 6. The absolute value of the amplified signal is obtained by means of an amplifier 7 which is connected as a rectifier. As a result, the stroke volume meter is rendered suitable for both polarities of the input voltage.

The output voltage of the amplifier 7 is applied to a first filter circuit 8, and also to an analog delay circuit 9.

The first filter circuit 8 (see also FIG. 3b) consists of two differentiators which are followed by a peakdetector and a comparator. The frequency characteristic of the differentiators is such that the amplification increases with the frequency up to about 20 Hz, and decreases above 20 Hz (so-called stopped differentiator)

so that high-frequency components of the signal (mainly noise) are suppressed.

The second derivative of PAO will have a maximum value at the instants $t_0$, $t_1$, $t_2$ and $t_3$. Therefore, the instants $t_1$, $t_2$, etc., at which the maximum values occur are determined from the second derivative by means of the peak detector and comparator. The comparator produces a pulse-shaped signal at each of these instants. This signal is applied to a logic circuit 11 which comprises inter alia a Schmitt-trigger 106 and a monostable multivibrator 107, by means of which a square-wave signal is obtained from the said pulse-shaped signal, the said square-wave signal consisting of pulses whose leading edge occurs each time at the instants $t_0$, $t_1$, $t_2$, etc, their width having a fixed value. This is the so-termed D-signal (see FIG. 1). The first filter circuit 8 causes a delay of a few milliseconds. Therefore, the delay circuit 9 is incorporated to provide a delay of the same number of milliseconds.

The delayed pressure signal from the delay circuit 9 is applied to a second filter circuit 10. This second filter circuit (FIG. 3b) comprises a band-pass filter which filters out the d.c. voltage component and the high and low frequencies, and delays the remaining signal once more. This bandpass filter is followed by a zero-passage detector. This detector supplies either a positive or a negative output voltage in accordance with the polarity of the output signal of the band-pass filter. The output signal of the zero detector is also applied to the logic circuit 11 which comprises a Schmitt-trigger 105 which converts the signal into a squarewave signal P (see FIG. 1). The maximum values of the second derivatives can thus be distinguished, i.e., when a maximum D occurs accompanied by a low value of P, $t_0$ is determined whereas $t_1$ is determined when pulse train D is a maximum accompanied by a high value of P.

Using the pulses P and D, the logic circuit 11 generates the pulses T, I and Z for the control of the remaining part of the circuit. To this end, the logic circuit 11 comprises a bistable multivibrator 110, the output voltage of which becomes high when a D-pulse appears while the P-signal is high, and becomes low when a D-pulse appears while the P-signal is low. This output voltage is the I-signal (see FIG. 1). On a second output of the bistable multivibrator 110 an inverted I-signal appears which is applied to a monostable multivibrator 108 which produces a pulse (the T-signal) at each trailing edge of the I-signal. The inverted T-signal is applied to a monostable multivibrator 109 which derives the Z-signal therefrom in a corresponding manner.

The delayed pressure signal from the circuit 9 is further used for the determination of the end diastolic pressure PED. To this end, the signal is applied to a minimum-value detector 12, which is provided with a switch 27 which is controlled by the T-signal. A stroke volume integrator 13 integrates the difference between PAO and PED between the instants $t_1$ and $t_2$ via a switch 28 which is controlled by the I-signal. At the end of this integration period, a sample-and-hold circuit 14 takes over the output voltage of the integrator 13, via a switch 30 under the control of the T-pulse, which appears immediately after the I-pulse. Subsequently, the integrator 13 is discharged via a switch 29 controlled by a Z-pulse, which appears immediately after the T-pulse, so that it is ready for the next integration period.

The sample-and-hold circuit 14 has an adjustable amplification, proportional to the calibration factor $1/Z_0$, so that the voltage on its output terminals 15, 15' is proportional to the determined stroke volume SV.

The diagram shown in FIG. 3 has been elaborated for an input quantity (the pressure PAO measured in the aorta) in the form of a proportional electrical signal, one volt corresponding to 100 millimeters of mercury. For that case the elements used in FIG. 3 are stated in the following table.

| | | |
|---|---|---|
| Amplifiers | | |
| 16, 22, 23, | 40.J | |
| 17, 18, 19, 20, 21, 24, 112 | Sn.72741 P | |
| Transistors | | |
| 25 | 2N 3904 | |
| 26 | 2N 3906 | |
| 27, 28, 29, 30 | 4391 | |
| Diodes | | |
| 31, 32, 33, 34, 35 | | |
| 36, 37, 38, 39, 40, 41 | | |
| 42, 43, 44 | BAX 17 | |
| 44, 46 | IN 712 | |
| 47 | IN 708 | |
| Capacitors | | |
| 49, 50 | $10^{-9}$ Farad | |
| 51 | $100^{-9}$ do. | |
| 52, 53, 64, 65 | $10^{-6}$ do. | |
| 54, 56, 57, 61, 62 | $470.10^{-9}$ Farad | |
| 55 | $4.4.10^{-6}$ do. | |
| 58, 63 | $47.10^{-9}$ do. | |
| 59, 60, 66 | $220.10^{-9}$ do. | |
| Resistors | | |
| 67, 68, 85, 88, 98, 99 | 100 k | Ohm |
| 69, 70 | 400 k | do. |
| 71, 72, 81, 92, 95, 96, 97, 104 | 10 k | do. |
| 73 | 5 k | do. |
| 74, 76 | 8.25K | do. |
| 75 | 33.2K | do. |
| 77, 78 | 24.9K | do. |
| 79 | 47k | do. |
| 80 | 470k | do. |
| 82, 111 | 2.7K | do. |
| 83, 86 | 18k | do. |
| 84, 87 | 82k | do. |
| 89 | 330k | do. |
| 90 | 4.7K | do. |
| 91 | 390k | do. |
| 93, 94 | 20k | do. |
| 100, 101 | 6.8K | do. |
| 102 | 2k | do. |
| 120 | 150k | do. |
| 103 | 100k | do. |
| | potentiometer | |
| Battery + | = + 5 volts | |
| ++ | = + 15 volts | |
| Schmitt-triggers | | |
| 105, 106 | | |
| Monostable Multivibrators | | |
| 107, 108, 109 | | |
| Bistable Multivibrator | | |
| 110 | | |

What is claimed is:

1. A stroke volume meter comprising, input means adapted to receive a signal that is proportional to the aorta blood pressure, means for deriving a first signal determined by the instant at which the blood pressure in the aorta reaches a first minimum value corresponding to the end diastolic aorta pressure and determined by the instant at which said blood pressure reaches a second minimum value corresponding to the incision, means responsive to the blood pressure signal for deriving a second signal determined by the value of the end diastolic aorta pressure, integration means responsive to the blood pressure signal and the second signal and adapted to integrate the blood pressure signal indicative exclusively of the part of the blood pressure in the aorta which exceeds the end diastolic aorta pressure from the instant at which this pressure is reached until the instant at which the incision is reached, and means for dividing the signal value obtained by said integration by an adjustable constant.

2. A volume meter as claimed in claim 1, characterized in that the means for deriving said first signal indicative of the instants at which the end diastolic pressure and the incision are reached comprise first filter circuit means coupled to said input means and adapted to produce a signal pulse each time the second derivative of the blood pressure signal has a maximum value, and second filter circuit means coupled to said input means and adapted to produce a further signal having two levels, the further signal having the first level when the value of the blood pressure signal exceeds the mean value and the further signal having the second level when the blood pressure signal has a value below the mean value, logic circuit means for providing control output signals, and means connecting the outputs of said filter circuits to said logic circuit means.

3. A volume meter as claimed in claim 2 wherein said logic circuit means includes means for deriving an output pulse signal indicative of the instant of incision, and said means for deriving a second signal determined by the value of the end diastolic aorta pressure comprises a minimum value detector controlled by said logic circuit means output pulse signal.

4. A volume meter as claimed in claim 3 wherein said logic circuit means includes means for deriving a control pulse-type signal that is indicative of the time period between said first and second minimum values of aorta blood pressure, and said integration means comprises an integrating circuit means having first and second inputs coupled to said input means and to the output of the minimum value detector, respectively, said integrating circuit means being adapted to integrate the difference between the signals applied to its first and second inputs, and means for coupling said logic circuit means control pulse-type signal to a control input of the integrating means circuit to control the latter circuit means.

5. A volume meter as claimed in claim 4 wherein said dividing means comprises sample and hold circuit means having an adjustable amplification, and means connecting the input of said sample and hold circuit means to the output of the integrating circuit means.

6. A method of determining the volume of blood pumped by the heart comprising, producing a first signal proportional to the aorta blood pressure, determining a first time at which the aorta blood pressure corresponds to the end diastolic aorta pressure, determining a second time at which the blood pressure corresponds to the incision, producing a second signal indicative of the value of the end diastolic aorta pressure, integrating the difference of said first and second signals in the interval between said first and second times to derive an output signal, and then dividing said output signal by an adjustable calibration constant related to an individual patient whose blood volume is being measured.

7. Apparatus for monitoring blood flow comprising, input means adapted to receive a signal proportional to the aorta blood pressure, means responsive to said blood pressure signal for deriving first and second signals indicative respectively of the time at which the aorta blood pressure corresponds to the end diastolic aorta pressure and the time said blood pressure corresponds to the incision, means responsive to said blood pressure signal for deriving a third signal indicative of the end diastolic aorta pressure, integration means having first and second inputs, a control input and an output, means for applying said blood pressure signal and said third signal to said first and second inputs, respectively, of the integration means, means for coupling said integration means control input to the means for deriving said first and second signals, said integration means including means responsive to the signal at the control input for integrating the difference between the signals at its first and second inputs during the time interval between the occurrence of said first and second signals, and means for modifying the integration signal at the output of the integration means by an adjustable calibration factor.

8. Monitoring apparatus as claimed in claim 7 wherein the means for deriving said first and second signals comprises, first and second filter means with their inputs coupled to said input means and their outputs coupled to first and second inputs of logic circuit means, said logic circuit means including means responsive to the signals received from said first and second filter means for deriving a squarewave type signal having a pulse width equal to the time interval corresponding to the time between the occurrence of said first and second signals, and said coupling means couples said squarewave type signal to the control input of the integration means.

9. Monitoring apparatus as claimed in claim 8 wherein said logic circuit means includes means for deriving an output pulse signal synchronized to the incision time, and the means for deriving said third signal includes a minimum vlaue detector controlled by the logic circuic means output pulse signal.

10. Monitoring apparatus as claimed in claim 9 wherein said modifying means comprises sample and hold circuit means with its input coupled to the output of the integration means and a control input coupled to the logic circuit means to receive said synchronized output pulse signal.

11. Monitoring apparatus as claimed in claim 8 wherein said first filter means includes first and second signal differentiating circuit means in cascade with a peak detector and comparator and said second filter means includes a band-pass filter in cascade with a zero-passage detector.

* * * * *